US012709185B2

(12) United States Patent
Ameziani et al.

(10) Patent No.: US 12,709,185 B2
(45) Date of Patent: Aug. 18, 2026

(54) METHOD FOR MANAGING A NETWORK OF STORAGE BATTERIES AND POWER SUPPLY UNIT OF AN ENGINE

(71) Applicant: RENAULT S.A.S, Boulogne Billancourt (FR)

(72) Inventors: Menouar Ameziani, Guyancourt (FR); Robert Lassartesses, Guyancourt Cedex (FR)

(73) Assignee: Ampere S.A.S., Boulogne Billancourt (FR)

( * ) Notice: Subject to any disclaimer, the term of this patent is extended or adjusted under 35 U.S.C. 154(b) by 750 days.

(21) Appl. No.: 18/247,027

(22) PCT Filed: Sep. 20, 2021

(86) PCT No.: PCT/EP2021/075782

§ 371 (c)(1),
(2) Date: Mar. 28, 2023

(87) PCT Pub. No.: WO2022/069276

PCT Pub. Date: Apr. 7, 2022

(65) Prior Publication Data

US 2023/0373348 A1 Nov. 23, 2023

(30) Foreign Application Priority Data

Sep. 30, 2020 (FR) ...................................... 2009998

(51) Int. Cl.
*H01M 10/44* (2006.01)
*B60L 58/12* (2019.01)
(Continued)

(52) U.S. Cl.
CPC ............... *B60L 58/18* (2019.02); *B60L 58/12* (2019.02); *B60L 2240/14* (2013.01); *B60L 2240/545* (2013.01); *B60L 2240/547* (2013.01)

(58) Field of Classification Search
CPC . H02J 7/0042; H02J 7/00; B60L 58/18; B60L 58/12; B60L 58/13; B60L 58/14;
(Continued)

(56) References Cited

U.S. PATENT DOCUMENTS 8,532,854 B2 * 9/2013 Tate, Jr. .................. B60L 58/22 701/22
10,183,590 B2 * 1/2019 Juang ...................... B60L 58/12
(Continued)

FOREIGN PATENT DOCUMENTS

EP 3 490 099 A1 5/2019
FR 2 942 086 A1 8/2010
WO WO-2011028168 A1 * 3/2011 ............ H02J 7/0032

OTHER PUBLICATIONS

International Search Report Issued Oct. 19, 2021, in PCT/EP2021/075782, filed on Sep. 20, 2021, 2 pages.
(Continued)

*Primary Examiner* — Edward Tso
(74) *Attorney, Agent, or Firm* — Oblon, McClelland, Maier & Neustadt, L.L.P.

(57) ABSTRACT

A method manages a network of storage batteries for supplying electric current to an engine of an electrically propelled motor vehicle. The network includes a first storage battery and at least a second storage battery connected in parallel, each storage battery being connected to the rest of the network via a relay which enables the storage battery to be isolated from every other storage battery. The method includes acquiring a state of charge for each storage battery, determining, by a computer, a control setpoint for each relay based on the acquired states of charge, and controlling the relays based on each determined control setpoint. In the acquiring, the computer acquires a value of a first parameter relating to a level of wear of each storage battery. In the determining, each control setpoint is determined based on the value of the first parameter.

14 Claims, 3 Drawing Sheets

(51) Int. Cl.
*B60L 58/18* (2019.01)
*H01M 10/46* (2006.01)

(58) Field of Classification Search
CPC ........... B60L 2240/545; B60L 2240/14; B60L 2240/547; B60L 58/16
USPC ........ 320/104, 107, 116, 118, 119, 132, 149, 320/150
See application file for complete search history.

(56) References Cited

U.S. PATENT DOCUMENTS

| | | | | |
|---|---|---|---|---|
| 10,436,845 | B2 * | 10/2019 | Weicker ............. | G01R 31/3648 |
| 2012/0083948 | A1 | 4/2012 | Tate, Jr. et al. | |
| 2012/0268070 | A1 | 10/2012 | Park et al. | |
| 2018/0086222 | A1 | 3/2018 | Juang et al. | |
| 2019/0165584 | A1 | 5/2019 | Laflaquiere et al. | |
| 2024/0092177 | A1 * | 3/2024 | Gerard ................ | H01M 16/006 |

OTHER PUBLICATIONS

Preliminary French Search Report mailed on Jun. 7, 2021, in FR 2009998 filed on Sep. 30, 2020 (3 pages), with Translation of Category of Cited Documents.

* cited by examiner

METHOD FOR MANAGING A NETWORK OF STORAGE BATTERIES AND POWER SUPPLY UNIT OF AN ENGINE

TECHNICAL FIELD OF THE INVENTION

The present invention relates in a general way to storage batteries of an electrically propelled vehicle.

More particularly, it relates to a method for managing a network of storage batteries suitable for supplying electric current to an engine of an electrically propelled motor vehicle, said network comprising a first storage battery and at least a second storage battery connected in parallel, each storage battery being connected to the rest of the network via a relay which enables this storage battery to be isolated from every other storage battery, and which is controlled by a computer, said method comprising the steps of:

- acquiring a state of charge for each storage battery,
- determining, by the computer, a control setpoint for each relay on the basis of the acquired states of charge, and
- controlling said relays on the basis of each determined control setpoint.

The invention also relates to a power supply unit for an engine.

PRIOR ART

Electrically propelled motor vehicles are equipped with storage batteries. The life of these storage batteries is an important parameter for the improvement of the performance of the vehicle, particularly as regards the maximum distance that can be covered.

A first solution for improving the life of storage batteries is that of increasing their capacity. However, this has a major drawback, namely the increase of the weight carried by the vehicle.

A second solution consists in using, in a particular manner, a plurality of elementary batteries (referred to hereafter as a battery pack) for supplying the electrically propelled vehicle.

In this context, the document EP3497776 describes a power supply unit for supplying an electric motor of an electric vehicle. This power supply unit comprises a plurality of interconnected battery packs. Each battery pack can be added to a combination of battery packs and removed separately.

According to this document, a control unit may be used to manage the connection and disconnection of each battery pack, taking into account the state of charge (SOC) of each battery pack. More precisely, the control unit controls the set of battery packs via switching elements, so as to maintain the same state of charge for each battery pack during the charge and discharge cycles for the power supply of the electric motor. However, it was found that, when such a method was used, the life of the battery packs was shorter than had been hoped.

DESCRIPTION OF THE INVENTION

The present invention proposes to improve the method for managing the network of elementary batteries used for the power supply of an electrically propelled vehicle.

More particularly, according to the invention, what is proposed is a method for managing a network of storage batteries suitable for supplying electric current to an engine of an electrically propelled motor vehicle as defined in the introduction, in which:

- in the acquisition step, the computer acquires the value of a first parameter relating to the level of wear of each storage battery, and
- in the determination step, each control setpoint is determined on the basis of the value of said first parameter.

Thus, because of the invention, the storage battery or batteries for supplying the engine are chosen on the basis of their state of charge, but also on the basis of the level of wear of each storage battery. Thus, the use of the different storage batteries is based on a compromise between their state of charge and their level of wear. This makes it possible to preserve the capacity of each storage battery as well as its life, since no storage battery is used more than the others.

Other advantageous and non-limiting characteristics of the method for managing the network of storage batteries according to the invention, considered individually or in any technically possible combination, are as follows:

- the determination of the control setpoint is implemented by the computer using an artificial neural network, by supplying to the input of said artificial neural network said states of charge, together with the value of the first acquired parameter, said control setpoint being obtained at the output of said artificial neural network;
- provision is made so that:
  - in the acquisition step, the computer acquires the value of at least a second parameter, chosen from among the voltage at the terminals of each storage battery, the temperature of each storage battery, and a configuration of advance of the motor vehicle, and
  - in the determination step, each control setpoint is determined on the basis of the value of each second parameter;
- the second parameter being the configuration of advance of the motor vehicle, when the configuration of advance of the motor vehicle corresponds to an acceleration phase of said motor vehicle, the control setpoint specifies the closure of the relay associated with the storage battery whose state of charge is highest and the opening of every other relay, provided that the first parameter indicates that the level of wear of this storage battery is lower than that of every other storage battery;
- the second parameter being the configuration of advance of the motor vehicle, when the determined configuration of advance of the motor vehicle corresponds to a braking phase of said motor vehicle, the control setpoint specifies the closure of the relay associated with the storage battery whose determined state of charge is lowest and the opening of every other relay, provided that the first parameter indicates that the level of wear of this storage battery is lower than that of every other storage battery;
- the control setpoint specifies the closure of the relays associated with each of the two storage batteries simultaneously when the voltages at their terminals are substantially equal; and
- provision is also made, after the use of the motor vehicle, for a step of determination by the computer of an instruction to charge, in an external power network, the storage battery whose determined state of charge is lowest, provided that the first parameter indicates that the level of wear of this storage battery is lower than that of every other storage battery.

The invention also relates to a power supply unit for an engine in a propelled motor vehicle, comprising:

- a first storage battery,
- at least a second storage battery, a computer suitable for implementing the method for managing the network of storage batteries, as defined above.

In this power supply unit, only one of the two storage batteries is connected to a DC converter. In a variant, each of the two storage batteries is connected to a separate DC converter. In a further variant, each of the two storage batteries is connected to a single DC converter.

Evidently, the different features, variants and embodiments of the invention may be associated with one another in various combinations, provided that they are not mutually incompatible or mutually exclusive.

BRIEF DESCRIPTION OF THE DRAWINGS

The following description, referring to the attached drawings which are provided by way of non-limiting example, will make the nature and application of the invention clear. In the attached drawings:

FIG. 1 shows in a highly schematic way a motor vehicle 1 comprising two driving wheels 2 and two non-driving wheels 18.

In this case, this is an electric vehicle. In a variant, it could also be a hybrid vehicle.

Figure 1:
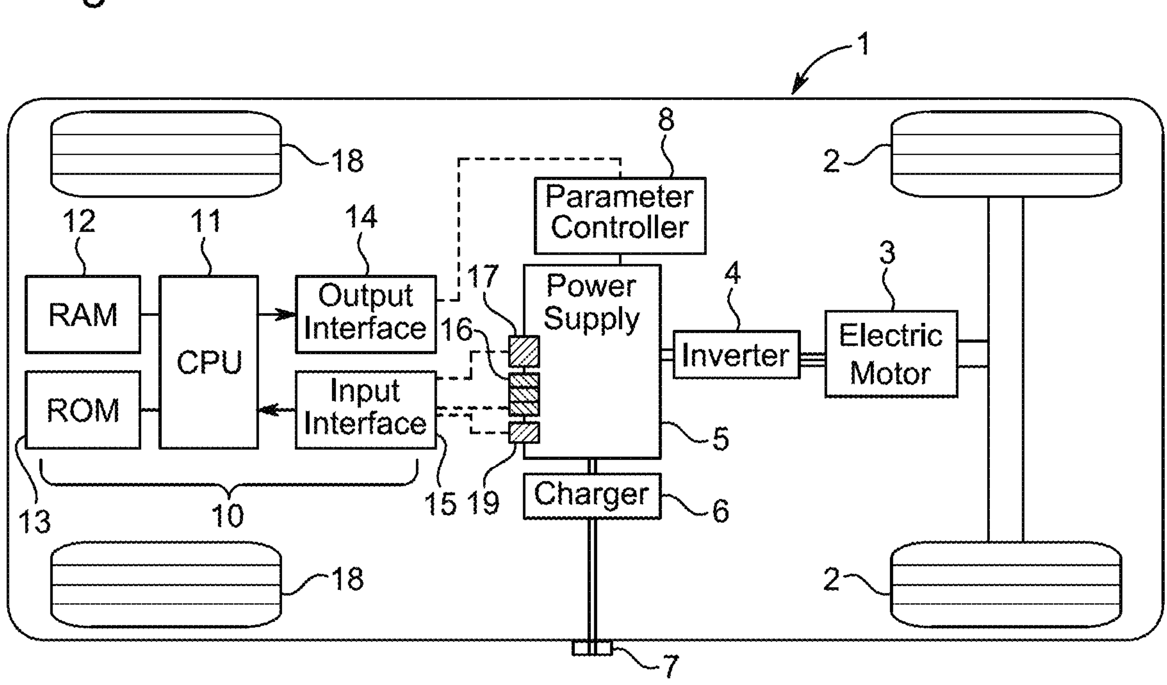
FIG. 1 is an example of a motor vehicle comprising a power supply unit according to the invention.

The motor vehicle 1 shown in FIG. 1 therefore comprises an electric engine 3 for driving the two driving wheels 2 in rotation.

It also comprises a power supply unit 5 for supplying current to this electric motor 3 via an inverter 4. This power supply unit 5, described in greater detail below, comprises a plurality of storage batteries 50, 52, 54, 56. In a conventional way, the inverter 4 is designed for transforming the DC current provided by the power supply unit 5 into a three-phase current.

The motor vehicle 1 also comprises a charger 6 equipped with a current outlet 7 which is accessible to the user for the connection of an electric plug connected to an external power network. This charger 6 is then provided for regulating the current from the external power network, in order to charge the power supply unit 5 in the best way.

The motor vehicle 1 also comprises means 8 for controlling parameters of the power supply unit 5.

These control means 8 are connected for this purpose to a means 17 for measuring the temperature T of each storage battery 50, 52, 54, 56 of the power supply unit 5, and a means 16 for acquiring a state of charge SOC of each storage battery 50, 52, 54, 56 of the power supply unit 5.

The measurement means 17 may conventionally take the form of temperature probes installed in each storage battery 50, 52, 54, 56 of the power supply unit 5.

The acquisition means 16, for its part, is provided for determining the state of charge SOC of each storage battery 50, 52, 54, 56 of the power supply unit 5, on the basis, for example, of the voltage at the terminals of each storage battery 50, 52, 54, 56. In this case it acquires a state of charge SOC, expressed as a percentage, for each storage battery 50, 52, 54, 56.

This state of charge SOC is considered to be equal to 100% when the corresponding storage battery 50, 52, 54, 56 is fully charged. It decreases when the storage battery 50, 52, 54, 56 in question supplies the electric motor 3 with current. It increases when the storage battery 50, 52, 54, 56 in question is supplied by the charger 6.

The motor vehicle 1 also comprises a means 19 for measuring the voltage at the terminals of each storage battery 50, 52, 54, 56 of the power supply unit 5.

For controlling its various active parts, the motor vehicle 1 has a computer 10 comprising a processor 11 (CPU), a random access memory 12 (RAM), a read-only memory 13 (ROM) and various input interfaces 15 and output interfaces 14.

By means of its input interfaces 15, the computer 10 can receive input signals from the measurement means 17, 19 and the acquisition means 16. It is thus suitable for acquiring the temperature T and the state of charge SOC of each storage battery 50, 52, 54, 56 of the power supply unit 5.

The computer 10 is also suitable for deducing, on the basis of the data obtained from previous uses of the motor vehicle 1 and stored in one of its memories, other parameters characterizing each storage battery 50, 52, 54, 56 of the power supply unit 5.

For example, the computer 10 determines, notably, a parameter relating to the level of wear of each storage battery 50, 52, 54, 56. This parameter relating to the level of wear of each storage battery corresponds, for example, to the state of health (SOH) of each storage battery 50, 52, 54, 56 of the power supply unit 5. The state of health SOH is expressed as a percentage.

For each storage battery 50, 52, 54, 56, this state of health SOH is considered to be equal to 100% at the moment when the storage battery 50, 52, 54, 56 is manufactured. It decreases as the storage battery 50, 52, 54, 56 is used.

In a variant, the parameter relating to the level of wear of each storage battery 50, 52, 54, 56 could correspond to the age of each storage battery 50, 52, 54, 56, to the period of use of each storage battery 50, 52, 54, 56, or to the number of charge and discharge cycles of each storage battery 50, 52, 54, 56. All these data are stored in one of the memories of the computer 10.

FIGS. 2 to 5 show different embodiments of the power supply unit 5.

As specified above, the power supply unit 5 comprises a plurality of storage batteries 50, 52, 54, 56. More precisely, in this case, in the examples of FIGS. 2 to 5, the power supply unit 5 comprises four storage batteries 50, 52, 54, 56, namely a main battery 50 and three auxiliary batteries 52, 54, 56.

Here, the main battery 50 cannot be removed from the power supply unit 5, whereas each of the auxiliary batteries 52, 54, 56 can be removed from the power supply unit 5 (preferably without using tools). This may, notably, enable the auxiliary batteries 52, 54, 56 to be removed from the vehicle and transported so that they can be recharged from an external power network, such as a home power network, without using the charger 6.

DETAILED DESCRIPTION

Each of the storage batteries 50, 52, 54, 56 is connected in parallel with the others.

As may be seen in FIGS. 2 to 5, each storage battery 50, 52, 54, 56 is connected to a relay 60, 60*a*, 60*b*, 62, 62*a*, 62*b*, 64, 64*a*, 64*b*, 66, 66*a*, 66*b* which enables each storage battery 50, 52, 54, 56 to be isolated from the others. Each relay 60, 60*a*, 60*b*, 62, 62*a*, 62*b*, 64, 64*a*, 64*b*, 66, 66*a*, 66*b* is independently controlled by the computer 10 for the purpose of connecting one or more of the storage batteries 50, 52, 54, 56 to the electric motor 3.

Figure 2:
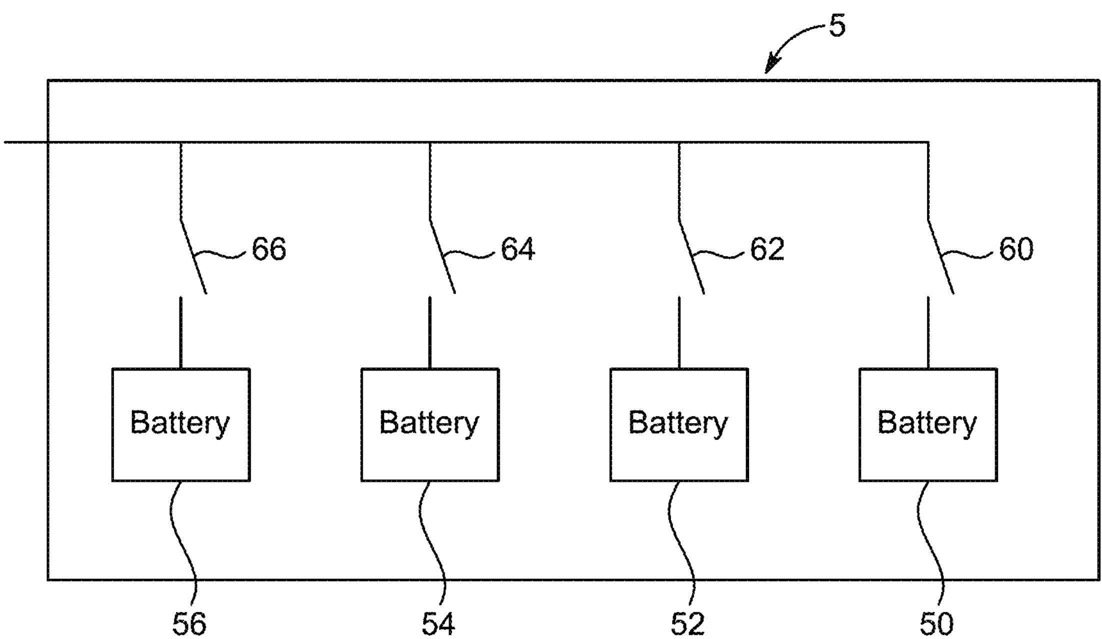
FIG. 2 shows a first example of a power supply unit according to the invention.

In the embodiment of FIG. 2, the power supply unit 5 comprises only these storage batteries and these relays.

Figure 3:
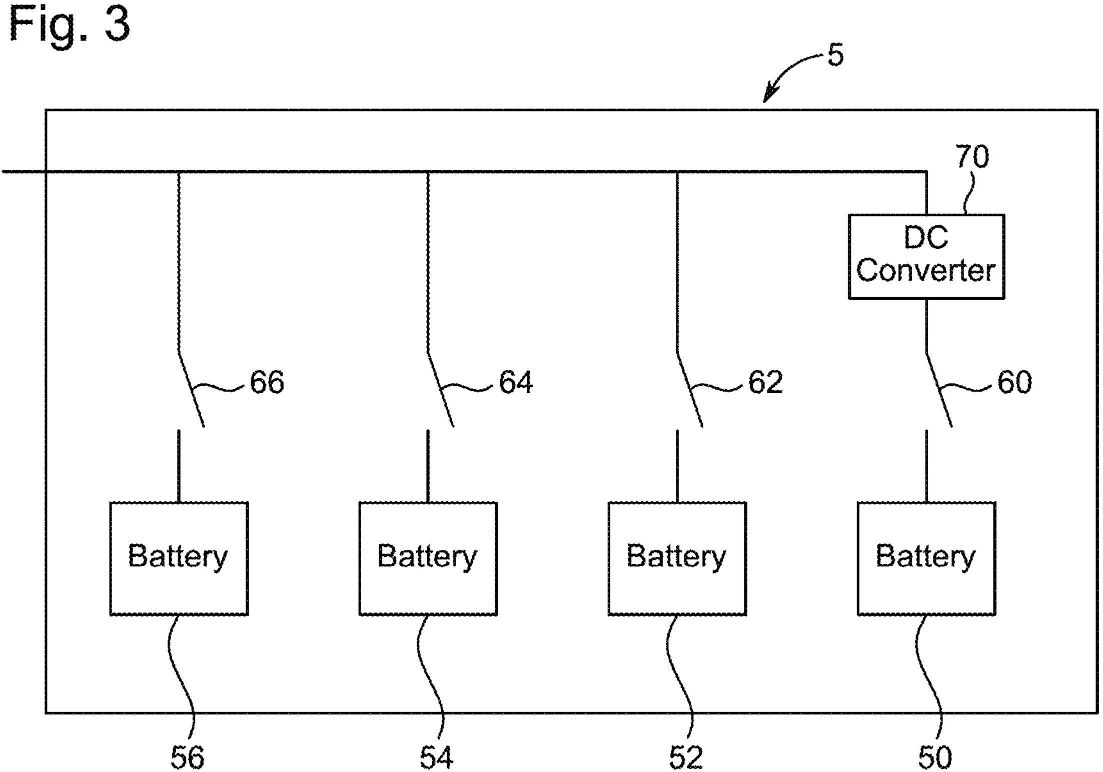
FIG. 3 shows a second example of a power supply unit according to the invention.
Figure 4:
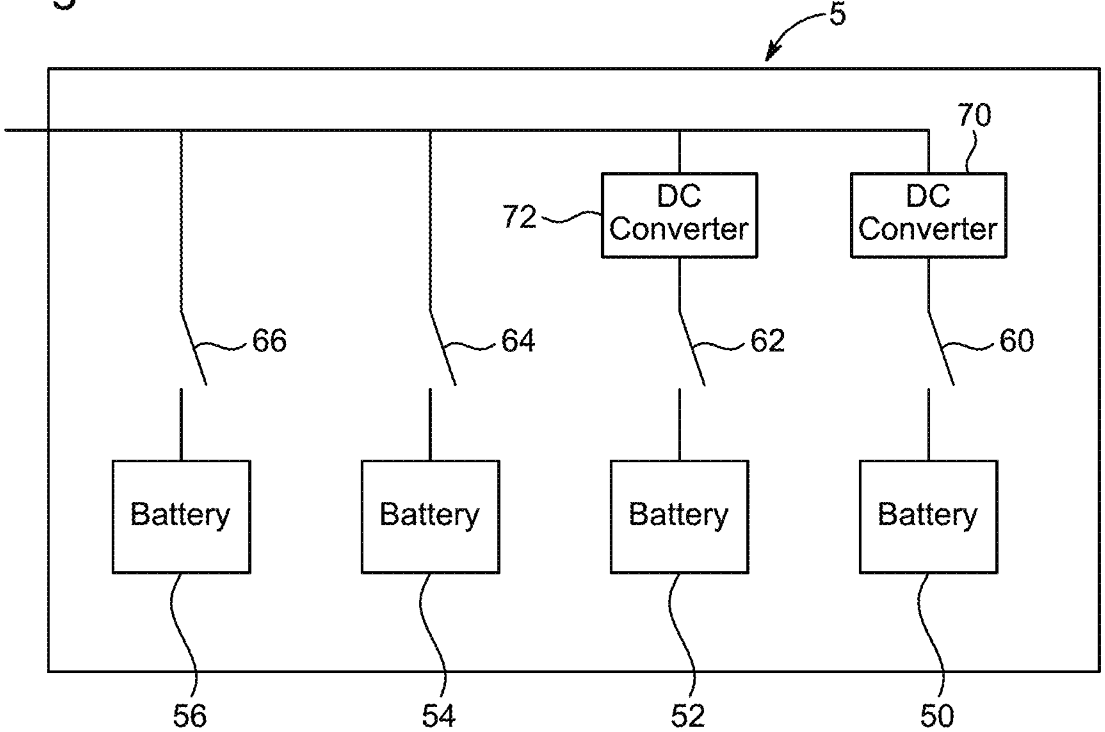
FIG. 4 shows a third example of a power supply unit according to the invention.
Figure 5:
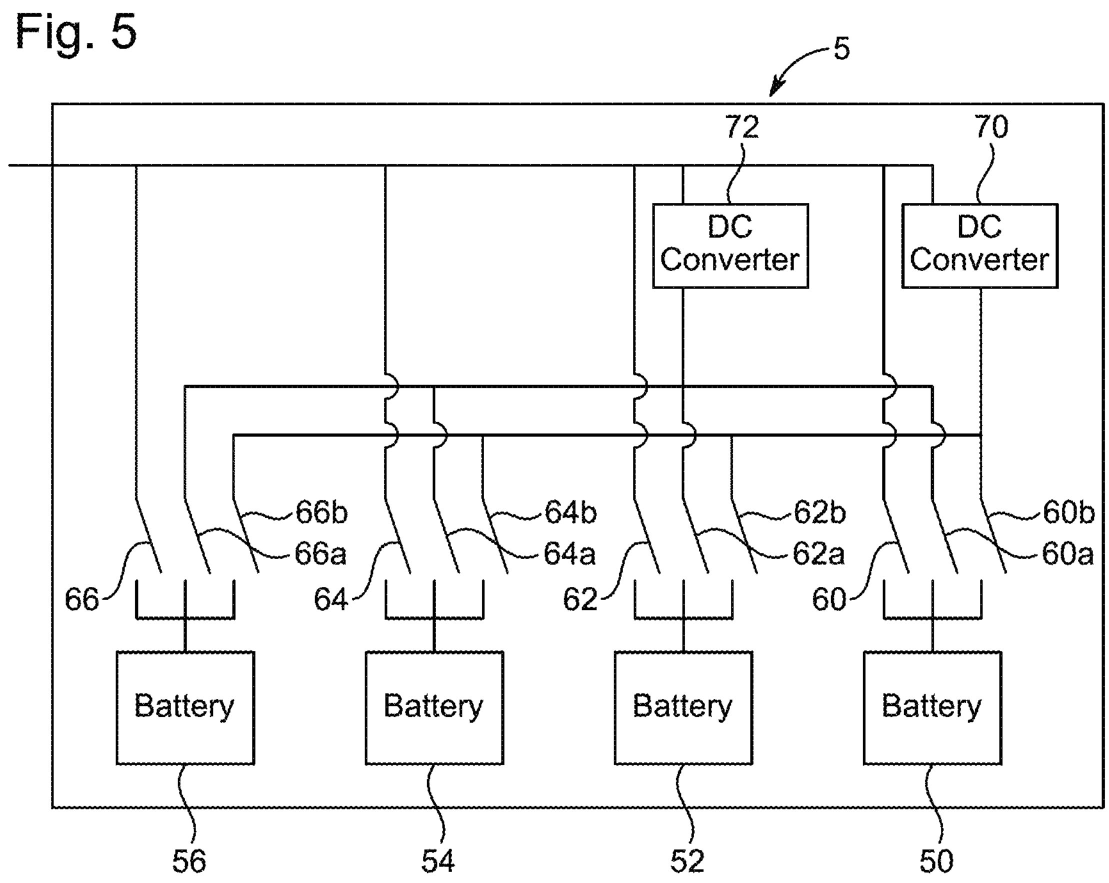
FIG. 5 shows a fourth example of a power supply unit according to the invention.

In the embodiments shown in FIGS. 3 to 5, it also comprises at least one DC converter 70, 72.

More precisely, in the embodiment shown in FIG. 3, a single storage battery, in this case the main battery 50, is connected to a single DC converter 70.

In a variant, a plurality of storage batteries, which may be all or only some of them, may be connected to one or more DC converters.

Thus, in the embodiment shown in FIG. 4, a first two of the four storage batteries 50, 52 are connected in series with two separate DC converters 70, 72. In this mode, the other two storage batteries 54, 56 are connected in parallel with each of the assemblies formed by one of the first two storage batteries 50, 52 and the DC converter 70, 72 associated with it.

In the embodiment shown in FIG. 5, all the storage batteries 50, 52, 54, 56 are suitable for connection to a DC converter. As shown in this FIG. 5, it is not necessary to incorporate a number of DC converters equal to the number of storage batteries. A plurality of relays 60, 60*a*, 60*b*, 62, 62*a*, 62*b*, 64, 64*a*, 64*b*, 66, 66*a*, 66*b* are used here for connecting each storage battery 50, 52, 54, 56 to the different DC converters.

More precisely, in this case each storage battery 50, 52, 54, 56 is suitable for direct connection to the inverter 4 (as in the case of FIG. 2) via the relays 60, 62, 64, 66, that is to say for connection to the inverter 4 via the DC converters 70, 72 and by means of the relays 60*a*, 60*b*, 62*a*, 62*b*, 64*a*, 64*b*, 66*a*, 66*b*. In this last case, each storage battery 50, 52, 54, 56 is then connected in series with one of the DC converters 70, 72. In these different embodiments, the DC converter 70, 72 is used as an adapter of the voltage obtained from the storage battery or batteries 50, 52, 54, 56 to which this converter 70, 72 is connected.

In practice, in the embodiment of FIG. 2, the voltage at the terminals of each storage battery 50, 52, 54, 56 must be substantially equal, in order to enable the electric motor 3 to be supplied from a plurality of substantially identical storage batteries 50, 52, 54, 56.

In the embodiments shown in FIGS. 3 to 5, the DC converter then makes it possible to adapt the voltage obtained from the storage battery 50, 52, 54, 56 to which it is connected, in order to make this voltage substantially equal to that of another storage battery 50, 52, 54, 56, so that at least two storage batteries 50, 52, 54, 56 can be connected simultaneously.

Advantageously, in this case, by using a DC converter it is then possible for at least two storage batteries 50, 52, 54, 56 to be connected simultaneously, even if the voltages at the terminals of each storage battery 50, 52, 54, 56 are substantially different.

For example, in the case of FIG. 3, the main battery 50 can be connected in parallel with any other auxiliary battery 52, 54, 56, regardless of the voltage at the terminals of the latter. This makes it possible, in particular, to provide more power for supplying the electric motor 3 than in the embodiment shown in FIG. 2.

The advantage of the embodiment shown in FIG. 4 is that it enables up to three storage batteries 50, 52, 54, 56 to be connected simultaneously.

Finally, the last configuration (FIG. 5) enables at least three of the storage batteries 50, 52, 54 to be connected simultaneously for supplying the electric motor 3. This configuration offers greater flexibility in managing the batteries used, by comparison with the configuration shown in FIG. 4 for example, because it makes it easier to select the storage battery or batteries 50, 52, 54, 56 to be connected for supplying the electric motor 3. The last-mentioned configuration is particularly suitable for the case where the power supply unit 5 comprises more than four storage batteries (for example, six or eight storage batteries).

The processor 11 of the computer 10 is suitable for implementing a method of managing the network of storage batteries 50, 52, 54, 56 of the power supply unit 5 for the purpose of supplying the electric motor 3 with electric current.

More particularly, because of software installed in its read-only memory 13, the computer 10 can control each relay 60, 60*a*, 60*b*, 62, 62*a*, 62*b*, 64, 64*a*, 64*b*, 66, 66*a*, 66*b* associated with each storage battery 50, 52, 54, 56 for the purpose of supplying the electric engine 3.

Figure 6:
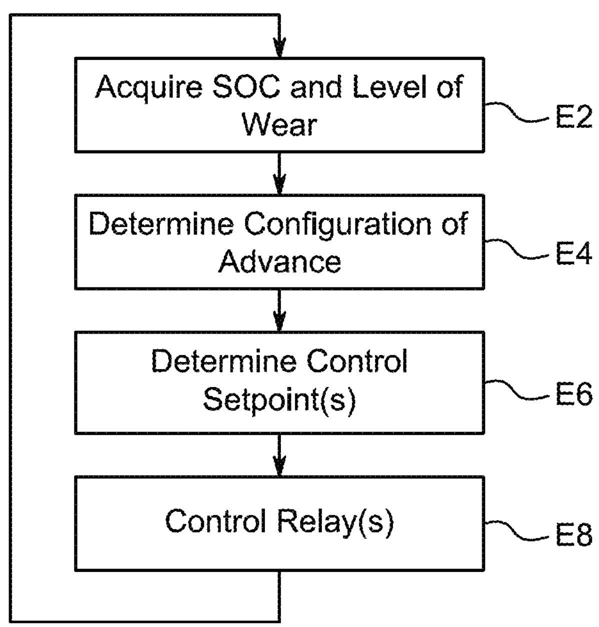
FIG. 6 shows, in the form of a flow diagram, an example of a method for managing the network of storage batteries according to the invention.

FIG. 6 shows, in the form of a flow diagram, an example of a method for managing the network of storage batteries, implemented by the computer 10.

Before the individual steps of the management method are described, it must be made clear that this method is implemented by the computer 10 in a loop throughout the use of the motor vehicle 1.

As shown in FIG. 6, the method starts in step E2, in which the computer 10 acquires the state of charge SOC of each storage battery 50, 52, 54, 56.

In this step, the computer 10 also acquires the value of at least one parameter relating to the level of wear of each storage battery 50, 52, 54, 56. Preferably, the computer 10 here determines the state of health SOH of each storage battery 50, 52, 54, 56.

In step E2, the computer 10 also determines, if necessary, the value of at least one other parameter relating to the level of wear of each storage battery 50, 52, 54, 56. For example, it determines the age of each storage battery 50, 52, 54, 56, or alternatively the number of charge and discharge cycles observed by each storage battery 50, 52, 54, 56.

It also determines the temperature of each storage battery 50, 52, 54, 56, using the measurement means 17, and the voltage at the terminals of each storage battery 50, 52, 54, 56, using the measurement means 19.

On completion of this step E2, the computer 10 therefore stores these parameters characterizing each storage battery 50, 52, 54, 56.

The method continues in step E4, in which the computer 10 determines the configuration of advance of the motor vehicle 1. "Configuration of advance" is here taken to mean the state of movement of the motor vehicle 1; that is, the computer 10 determines whether the motor vehicle 1 is in an acceleration phase or a braking phase or a stable advance phase or a stop phase with the electric engine 3 stopped (for example, when the motor vehicle 1 is parked after using the electric engine).

On the basis of the various parameters acquired and the configuration of advance of the motor vehicle 1, the computer 10 obtains a picture of the state of the storage batteries 50, 52, 54, 56 and the present advance of the motor vehicle 1, for the purpose of determining how to manage the network of batteries, and therefore how best to supply the electric engine 3.

More precisely, according to the data acquired in step E2, the computer 10 determines a control setpoint for each relay 60, 60*a*, 60*b*, 62, 62*a*, 62*b*, 64, 64*a*, 64*b*, 66, 66*a*, 66*b* associated with each storage battery 50, 52, 54, 56 (step E6). Preferably, in this case, the computer 10 determines the control setpoint on the basis of the state of charge and the determined parameters relating to the level of wear of each storage battery 50, 52, 54, 56.

In practice, the determination of the control setpoint is based on the implementation of an artificial neural network. The states of charge SOC of each storage battery 50, 52, 54, 56, the temperatures of each storage battery 50, 52, 54, 56, the voltages at the terminals of each storage battery 50, 52, 54, 56, and all the parameters relating to the level of wear of each storage battery 50, 52, 54, 56 are supplied to the input of this artificial neural network. The control setpoint for each relay 60, 60*a*, 60*b*, 62, 62*a*, 62*b*, 64, 64*a*, 64*b*, 66, 66*a*, 66*b* is then obtained at the output of the artificial neural network. More precisely, in this case the artificial neural network will have as its inputs the instantaneous data in the form of the voltages, the currents supplied by the batteries, the states of charge SOC, and the periods of use (i.e. the age of the batteries). It will also use as an input at least some of the outputs of this neural network (notably the states of health SOH of the batteries). The neural network will supply at its output the states of health SOH of the batteries, together with the control setpoints of the relays. The configuration of this network will be of the Perceptron network type, with one or two layers, and with a return like that of a Hopfield network, in order to retain the log data (providing a memory effect). Here, this return is provided by the data item “states of health SOH of the batteries”. The network comprises a hidden layer of 20 neurons, or two hidden layers of 10 neurons each.

The training of the neural network will take place by back propagation of the error gradient on a training set. The training set will take the form of values of battery data that are already known, or, in a variant, will be produced by a mathematical model.

According to a first example, in the case where the configuration of advance corresponds to an acceleration phase of the motor vehicle 1, the control setpoint specifies the closure of the relay 60, 60*a*, 60*b*, 62, 62*a*, 62*b*, 64, 64*a*, 64*b*, 66, 66*a*, 66*b* associated with the storage battery whose state of charge SOC is highest, and the opening of the other relays, if the parameters relating to the level of wear of the battery concerned are lower than those of the other storage batteries. In particular, the storage battery associated with the closed relay is that which exhibits the highest state of health SOH relative to the other storage batteries.

In practice, the purpose of the control setpoint is to identify the storage battery (which will supply the electric engine 3) for which a compromise is accepted between the state of charge SOC of the storage battery and the value of the parameters relating to its level of wear. For example, it may be envisaged that, if the storage battery 50, 52, 54, 56 having the highest state of charge SOC is also the one for which the value of the parameters relating to its level of wear is highest, then this battery will not be used to supply the electric engine 3. Preferably, another of the storage batteries 50, 52, 54, 56, for which the value of the parameters relating to its level of wear is lower, will be used. This has the advantage of enabling the capacity and life of the batteries to be preserved by using only the less worn battery or batteries, provided that they are sufficiently charged, for supplying the electric engine 3.

If a plurality of storage batteries 50, 52, 54, 56 have substantially equal voltages at their terminals, the control setpoint specifies the simultaneous closure of the relays 60, 60*a*, 60*b*, 62, 62*a*, 62*b*, 64, 64*a*, 64*b*, 66, 66*a*, 66*b* associated with each storage battery 50, 52, 54, 56 concerned.

If the power supply unit 5 comprises one or more DC converters 70, 72, the control setpoint also specifies the simultaneous closure of the relays 60, 60*a*, 60*b*, 62, 62*a*, 62*b*, 64, 64*a*, 64*b*, 66, 66*a*, 66*b* associated with the storage batteries corresponding to the conditions corresponding to the configuration of advance that has been identified. If, in step E4, the determined configuration of advance corresponds to a deceleration phase, the control setpoint specifies the closure of the relay 60, 60*a*, 60*b*, 62, 62*a*, 62*b*, 64, 64*a*, 64*b*, 66, 66*a*, 66*b* associated with the storage battery whose state of charge SOC is lowest, if the parameters relating to the level of wear of the storage battery concerned are lower than those of the other storage batteries. In particular, the storage battery associated with the closed relay is that which exhibits the highest state of health SOH relative to the other storage batteries. The choice of the storage battery 50, 52, 54, 56 with the lowest state of charge will then enable the connected storage battery to be charged during this braking phase.

Here also, the purpose of the control setpoint is to identify the storage battery (which will supply the electric engine 3) for which a compromise is accepted between the state of charge SOC of the storage battery and the value of the parameters relating to its level of wear.

If the determined configuration of advance corresponds to a stop phase of the motor vehicle 1 after the use of the vehicle, the control setpoint is an instruction to charge the storage battery 50, 52, 54, 56 whose state of charge SOC is lowest, and for which the parameters relating to the level of wear of the storage battery concerned are lower than those of the other storage batteries. In other words, the user is notified of the storage battery to be recharged before his vehicle is used again.

The storage battery may be charged from an external power network, by using the charger 6 for example, or by removing the battery concerned from the power supply unit 5 if it is an auxiliary battery 52, 54, 56.

When the control setpoint has been determined, the method continues to step E8. In this step, the computer 10 controls the relays 60, 62, 64, 66 on the basis of the control setpoint determined in step E6. At the end of this step, the electric engine 3 is therefore supplied by one or more storage batteries 50, 52, 54, 56 of the power supply unit 5.

As shown in FIG. 6, the method then resumes at step E2, in order to supply the electric engine 3 in an optimal way during the use of the motor vehicle 1.

The invention claimed is:

1. A method for managing a network of storage batteries for supplying electric current to an engine of an electrically propelled motor vehicle, said network comprising a first storage battery and at least a second storage battery connected in parallel, each storage battery being connected to the rest of the network via a relay which enables said storage battery to be isolated from every other storage battery, and which is controlled by a computer, said method comprising:

acquiring a state of charge for each storage battery;

determining, by the computer, a control setpoint for each relay based on the acquired states of charge; and controlling said relays based on each determined control setpoint, wherein:

in the acquiring, the computer acquires a value of a first parameter relating to a level of wear of each storage battery, the level of wear for each battery being different than the state of charge, and in the determining, each control setpoint is determined based on said value of said first parameter.

2. The method as claimed in claim 1, wherein the determining the control setpoint is implemented by the computer using an artificial neural network, by supplying to an input of said artificial neural network said states of charge, together with the value of the first acquired parameter, said control setpoint being obtained at an output of said artificial neural network.

3. The method as claimed in claim 1, wherein:

in the acquiring, the computer acquires a value of at least a second parameter chosen from among a voltage at terminals of each storage battery, a temperature of each storage battery, and a configuration of advance of the motor vehicle, and in the determining, each control setpoint is determined based on the value of each second parameter.

4. The method as claimed in claim 3, wherein, the second parameter being the configuration of advance of the motor vehicle, when the configuration of advance of the motor vehicle corresponds to an acceleration phase of said motor vehicle, the control setpoint specifies a closure of the relay associated with the storage battery whose state of charge is highest and an opening of every other relay, provided that the first parameter indicates that the level of wear of the storage battery is lower than that of every other storage battery.

5. The method as claimed in claim 3, wherein, the second parameter being the configuration of advance of the motor vehicle, when the determined configuration of advance of the motor vehicle corresponds to a braking phase of said motor vehicle, the control setpoint specifies a closure of the relay associated with the storage battery whose determined state of charge is lowest and an opening of every other relay, provided that the first parameter indicates that the level of wear of the storage battery is lower than that of every other storage battery.

6. The method as claimed in claim 3, wherein the control setpoint specifies a closure of the relays associated with two of the storage batteries simultaneously when the voltages at the terminals at the two of the storage batteries are substantially equal.

7. The method as claimed in claim 3, wherein the level of wear is based upon an age of each storage battery.

8. The method as claimed in claim 3, wherein the level of wear is based upon a number of charge and discharge cycles of each storage battery.

9. The method as claimed in claim 3, wherein the level of wear is equal to 100% at a time when each battery is manufactured and decreases based on a period of use from the time when each battery is manufactured.

10. The method as claimed in claim 1, further comprising, after using the motor vehicle determining by the computer an instruction to charge, in an external power network, the storage battery whose determined state of charge is lowest, provided that the first parameter indicates that the level of wear of the storage battery is lower than that of every other storage battery.

11. A power supply unit for an engine in a propelled motor vehicle, comprising:

first storage battery;

the second storage battery; and a computer configured to implement the method as claimed in claim 1.

12. The power supply unit as claimed in claim 11, wherein only one of the first and second storage batteries is connected to a DC converter.

13. The power supply unit as claimed in claim 11, wherein each of the first and second storage batteries is connected to a separate DC converter.

14. The power supply unit as claimed in claim 11, wherein each of the first and second storage batteries is connected to a single DC converter.

* * * * *